United States Patent
Talpade et al.

(10) Patent No.: US 8,315,186 B2
(45) Date of Patent: Nov. 20, 2012

(54) SYSTEM FOR EXTRACTING AND COMBINING INFORMATION FROM IP DEVICE CONFIGURATIONS, INVENTORY SYSTEMS, AND REAL-TIME NETWORK MONITORING

(75) Inventors: Rajesh R. Talpade, Madison, NJ (US); Lisa Bahler, Basking Ridge, NJ (US); Alice Cheng, Piscataway, NJ (US); Alexander Poylisher, Brooklyn, NY (US); Shrirang Gadgil, Eatontown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 12/362,273

(22) Filed: Jan. 29, 2009

(65) Prior Publication Data
US 2009/0190499 A1 Jul. 30, 2009

Related U.S. Application Data

(60) Provisional application No. 61/062,733, filed on Jan. 29, 2008.

(51) Int. Cl.
*H04L 12/28* (2006.01)
(52) U.S. Cl. ........ 370/254; 370/253; 370/255; 709/217; 709/224
(58) Field of Classification Search .................. 370/253, 370/254, 255; 709/217, 223, 224; 707/103; 705/28
See application file for complete search history.

(56) References Cited

U.S. PATENT DOCUMENTS

| | | | | |
|---|---|---|---|---|
| 5,295,244 | A * | 3/1994 | Dev et al. | 715/853 |
| 6,006,202 | A * | 12/1999 | Ramaswamy et al. | 705/28 |
| 6,122,639 | A * | 9/2000 | Babu et al. | 1/1 |
| 6,292,827 | B1 * | 9/2001 | Raz | 709/217 |
| 6,611,867 | B1 * | 8/2003 | Bowman-Amuah | 709/224 |
| 6,785,673 | B1 | 8/2004 | Fernandez et al. | |
| 7,020,697 | B1 * | 3/2006 | Goodman et al. | 709/223 |
| 7,080,141 | B1 * | 7/2006 | Baekelmans et al. | 709/224 |
| 7,218,094 | B2 * | 5/2007 | Khandros et al. | 324/158.1 |
| 7,315,887 | B1 * | 1/2008 | Liang et al. | 709/223 |
| 7,318,094 | B1 * | 1/2008 | Kirti et al. | 709/223 |
| 7,366,768 | B2 * | 4/2008 | Deo et al. | 709/217 |
| 7,668,953 | B1 * | 2/2010 | Sinclair et al. | 709/224 |
| 7,898,971 | B2 * | 3/2011 | Qian et al. | 370/250 |
| 7,979,530 | B1 * | 7/2011 | Lee | 709/224 |
| 2002/0184340 | A1 * | 12/2002 | Srivastava et al. | 709/219 |
| 2002/0188643 | A1 | 12/2002 | Kennedy | |
| 2003/0212908 | A1 * | 11/2003 | Piesco | 713/201 |

(Continued)

OTHER PUBLICATIONS

International Search Report, dated Mar. 30, 2009.

*Primary Examiner* — Ayaz Sheikh
*Assistant Examiner* — Andrew C Lee
(74) *Attorney, Agent, or Firm* — Philip J. Feig

(57) ABSTRACT

The inventive system and method for improving network security, availability, and regulatory compliance, and maximizing a network comprises a network configuration component, a network inventory component, a network monitoring component, and a network assessment component, wherein information is extracted from each of the configuration, inventory, and monitoring components, the extracted information is combined and assessed in the assessment component, and the maximized network is produced using the combined information. In one embodiment, the combined information is stored in a database. In one embodiment, an XML is produced from the extracted inventory information, and this XML is converted to a canonical form.

15 Claims, 4 Drawing Sheets

U.S. PATENT DOCUMENTS

| | | | |
|---|---|---|---|
| 2003/0217129 A1* | 11/2003 | Knittel et al. | 709/223 |
| 2005/0262483 A1* | 11/2005 | Laird | 717/120 |
| 2006/0041658 A1* | 2/2006 | Nelson et al. | 709/224 |
| 2006/0059262 A1* | 3/2006 | Adkinson et al. | 709/225 |
| 2006/0112175 A1* | 5/2006 | Sellers et al. | 709/223 |
| 2007/0005641 A1* | 1/2007 | Hegde et al. | 707/103 R |
| 2007/0066297 A1* | 3/2007 | Heidari-Bateni | 455/423 |
| 2007/0088630 A1* | 4/2007 | MacLeod et al. | 705/28 |
| 2007/0157286 A1* | 7/2007 | Singh et al. | 726/1 |
| 2008/0034070 A1* | 2/2008 | Tan et al. | 709/220 |
| 2009/0094521 A1* | 4/2009 | Hung et al. | 715/736 |
| 2010/0020715 A1* | 1/2010 | Monaco et al. | 370/252 |
| 2010/0211817 A1* | 8/2010 | Yang et al. | 714/4 |

* cited by examiner

SYSTEM FOR EXTRACTING AND COMBINING INFORMATION FROM IP DEVICE CONFIGURATIONS, INVENTORY SYSTEMS, AND REAL-TIME NETWORK MONITORING

CROSS REFERENCE TO RELATED APPLICATIONS

The present invention claims the benefit of U.S. provisional patent application 61/062,733 filed Jan. 29, 2008, the entire contents and disclosure of which are incorporated herein by reference as if fully set forth herein.

This application is related to commonly-owned, co-pending U.S. patent application Ser. No. 11/900,674 filed on Sep. 12, 2007, the entire contents and disclosure of which is expressly incorporated by reference as if fully set forth herein.

FIELD OF THE INVENTION

The present invention relates generally to network administration. The invention concerns rigorous and non-intrusive assessment of IP device configurations, combining real-time, inventory, and configuration data, to improve network security, availability, and regulatory compliance, and to maximize network performance.

BACKGROUND OF THE INVENTION

Internet Protocol (IP) networks connect network devices or nodes, such as routers, switches, firewalls, etc., using communication channels, such as data transmission media including optical fibers, coaxial cable, satellite links, etc. Network administrators typically use an inventory system to keep track of their IP network devices and how they are inter-connected. This inventory system can be a sophisticated software solution, such as Telcordia® Granite Inventory, or a simple spreadsheet. The specific system depends on the size of the network, its complexity, and its importance to the organization's business.

Most network devices generate and provide real-time data documenting their own status. Examples of this data include interface up/down status, packet delay and loss rate, network element load, routing/forwarding table, and alerts/alarms. Such data can be provided by the Simple Network Management Protocol (SNMP), and can accord with Management Information Base (MIB-II) data for use with network management protocols in TCP/IP-based internets.

Configuration managers or configuration management provide information regarding the network configuration. Such systems include data documenting and/or describing the inter-connections among network devices. A variety of software products are available to assist a network administrator with configuration management.

Efforts to provide assurances that a network is secure and in compliance with policy are described in applicant's commonly-owned, co-pending application, U.S. patent application Ser. No. 11/900,674. This application discloses a system and method for IP network policy compliance assessment using a non-intrusive, rigorous methodology.

However, current systems merely maintain an inventory of the network devices and their inter-connectivity, and/or assess whether the network is secure and/or in compliance with specific protocols. There is a need for a system and method that provides resource management capabilities to not only improve network security, availability, and regulatory compliance but also to maximize the performance of the network system components.

BRIEF SUMMARY OF THE INVENTION

The present invention advantageously provides a system and method for improving network security, availability, and regulatory compliance, and for maximizing network performance by extracting and combining the "real-time" network data with "physical connectivity" information from network inventory, and with "logical" information from network configuration management.

The inventive system and method for improving security, availability, and regulatory compliance, and for maximizing a network comprises a network configuration component, a network inventory component, a network monitoring component, and a network assessment component, wherein information is extracted from each of the configuration, inventory, and monitoring components, the extracted information is combined and assessed in the assessment component, and the maximized network is produced using the combined information. In one embodiment, the combined information is stored in a database. In one embodiment, an XML is produced from the extracted inventory information, and this XML is converted to a canonical form.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

The present invention advantageously provides a system and method for extracting and combining the "real-time" network data with the "physical connectivity" information from network inventory and the "logical" information from network configuration management.

Figure 1:
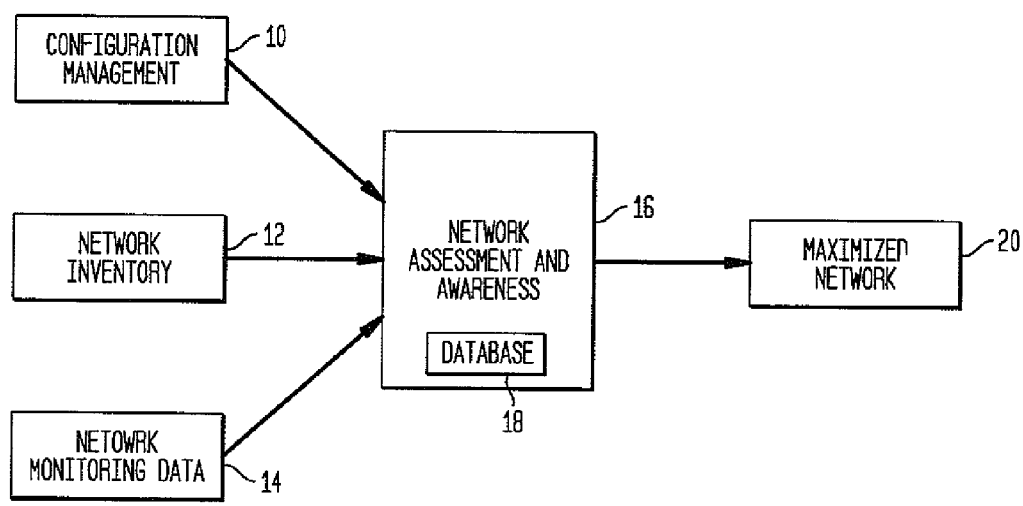
FIG. 1 is a schematic diagram of the inventive system.

FIG. 1 is a schematic diagram of an exemplary embodiment of the system including a network configuration management component 10, a network inventory component 12, and a network monitoring component 14. Data from each of these components is extracted, as describe in more detail below, and the extracted data is input to the network assessment and awareness component 16. This assessment component 16 combines the data extracted from the three separate components, configuration management 10, inventory 12, and real-time or monitoring data 14. In one embodiment, the extracted data is stored in database tables 18 in the assessment component 16. When the extracted data is combined, the assessment component 16 assesses and produces information, such as reports and topology visualization, defining a maximized network 20 having improved security, availability, and regulatory compliance.

In accordance with the present invention, the assessment component 16 can identify inconsistencies between inventory and configurations. Network operators often make errors in physically connecting devices with each other, such as inserting cables into or unplugging cables from the wrong device ports. Errors can also be made while entering device and connectivity information into the inventory system. A simple check in which it is established that all device interfaces with the same IP subnet address in their configurations are also shown as being physically connected to each other can eliminate these consistency errors. Hence, the inventive assessment component 16 can produce a maximized network 20 having no discrepancies between physical connectivity and logical connectivity.

Similarly, the assessment component 16 can identify inconsistencies between actual real-time network state, and intent as represented by information in the network policies/rules, configurations, and inventory. Transient conditions may cause IP network paths and topologies to violate network policies/rules. One such rule could be to ensure that sensitive traffic from one part of the network to another does not flow through an unprotected part of the network. Combining the real-time network information with the configuration and inventory information helps detect such violations. Accordingly, a maximized network 20 that minimizes discrepancies between real-time network data and physical and logical network connectivity can be produced by the assessment component 16.

The assessment component 16 can also enable assessments of rules that require inventory and real-time information in addition to configurations.

Figure 2:
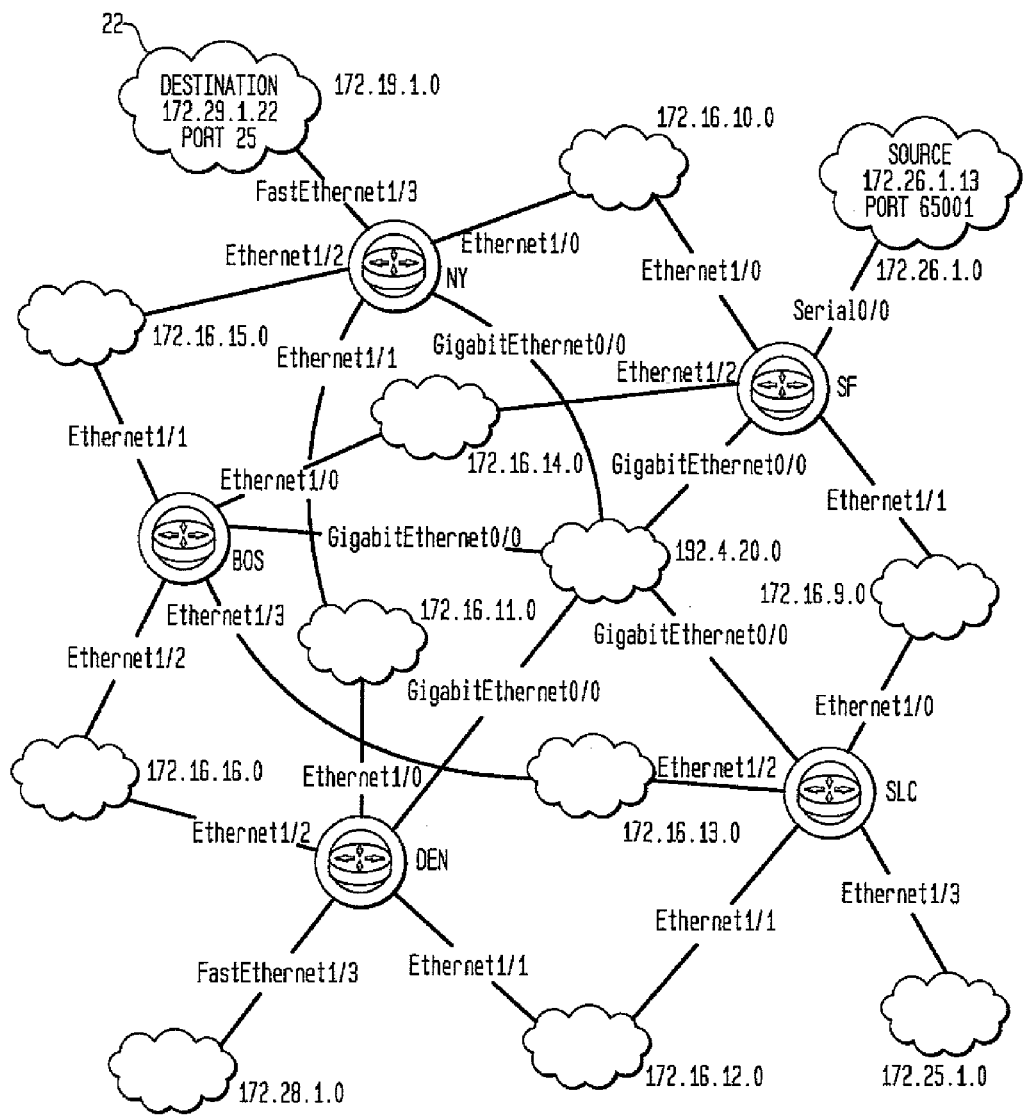
FIG. 2 is an IP network topology map.

Further, the assessment component 16 can provide comprehensive and in-depth topology visualizations that leverage inventory, real-time, and configuration information. An example IP network topology map 22 generated automatically by the assessment component 16 using this combined information is shown in FIG. 2. Similar maps can also be generated for other IP protocols such as VLAN, VPN, and routing.

Figure 3:
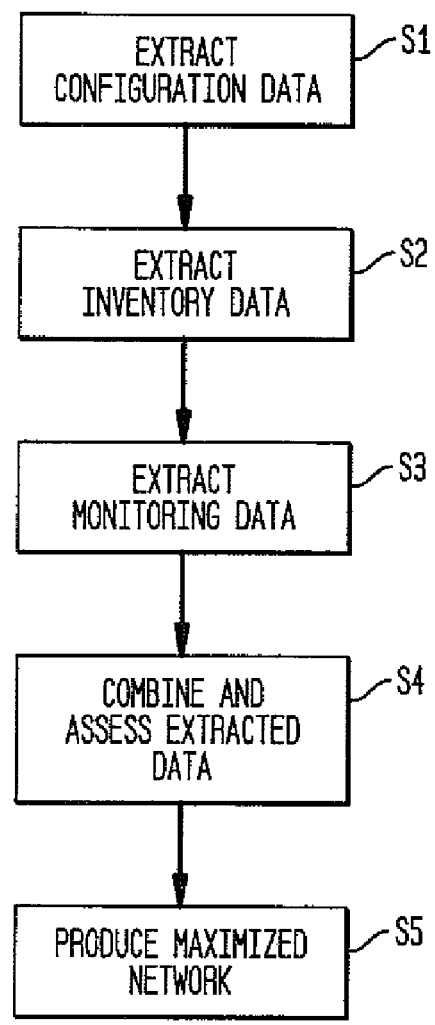
FIG. 3 is a flow diagram of the inventive system.

FIG. 3 is a flow diagram of an exemplary embodiment of the present invention. In step S1, configuration data is extracted from the configuration management component 10. In step S2, inventory data is extracted from the network inventory component 12. Details regarding the inventory data extraction are provided below. In step S3, monitoring data is extracted from the network monitoring component 14. The extracted data is combined, such as in the database 18, and assessed in step S4 by the assessment component 16. In step S5, a maximized network 20 is produced. The maximized network 20 can be, for example, a report or series of reports, or a visualized topology map 22.

Figure 4:
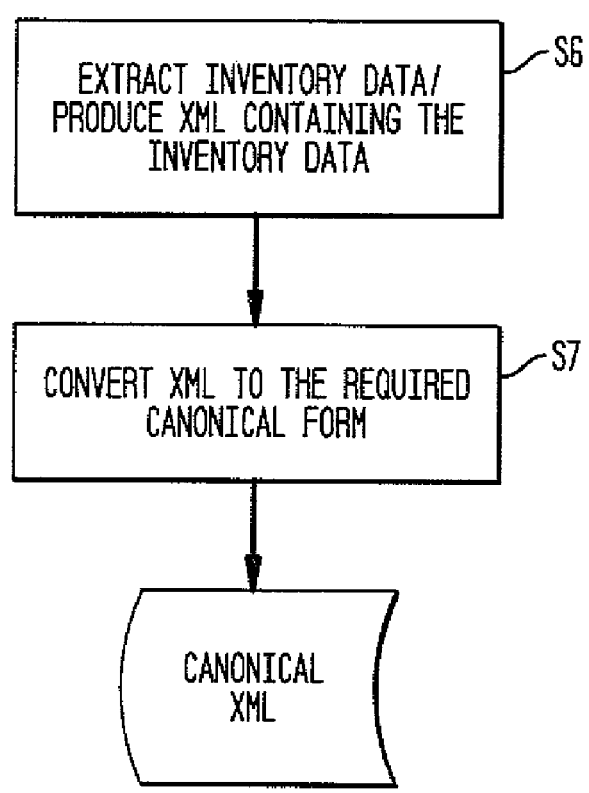
FIG. 4 is a flow diagram of extraction of inventory data in accordance with the inventive method.

FIG. 4 is a flow diagram data extraction from an inventory system or component 12. In step S6, an XML containing inventory data is produced from inventory data extracted from the inventory component 12. In step S7, the XML is converted to the required canonical form. Hence a canonical XML is created. Note that a user can interact with the assessment component 16 to specify the canonical XML file that will ultimately be used to upload the inventory information into the database 18.

In one approach for step S6, an XML file that contains the inventory data can be produced directly by the inventory component 12. For instance, if the inventory component 12 is an Excel spreadsheet, it can be saved as XML. This ML file will not be in the canonical format required by the awareness component 16, but the XML file can be converted to this format quite easily. For example, this conversion can be done using a commercial off-the-shelf software (COTS) tool to map the XML schema for the tool-generated XML to the XML schema required by the assessment component XML, thus producing an XSL transform. In this situation, no special, separate or external code needs to be written to produce the canonical XML.

In another approach for step S6, the inventory data management system or tool 12 will not be able to produce an XML representation of its data, but it may provide an API to extract that data via method calls. Code can be written to invoke the proper API calls to collect the inventory data and then to create the canonical assessment component XML file from the collected data. The software that interacts with the inventory data source in this way to produce the canonical inventory file is known as an Inventory Driver. These Inventory Drivers are specific to, but separate from, particular inventory systems 12.

The canonical file, however it is produced, will be parsed by the assessment component 16 and used to populate database tables 18 that represent the inventory data. In one embodiment, a module known as the Inventory Interface Module can be used to upload the externally produced canonical XML file into the assessment component database 18. This generic Inventory Interface Module can be used to process the data extracted from any inventory system 12 and to enter the extracted data into the database tables 18. These inventory-specific database tables 18 can be combined with other database tables 18 and used by the assessment component or engine 16 to assess the component. For example, the correlation of the inventory connectivity data with the device connectivity data can be determined.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While the present invention has been described in particular embodiments, it should be appreciated that the present invention should not be construed as limited by such embodiments, but rather construed according to the below claims.

What is claimed is:

1. A system for maximizing performance of a network, comprising:
   a network configuration component;
   a network inventory component;
   a network monitoring component; and
   a network assessment component, wherein information is extracted from each of the configuration, inventory, and monitoring components, the extracted information is combined and device configuration is assessed in the assessment component, the assessment component at least determining whether inconsistencies exist between the information extracted from the network configuration component and the information extracted from the network inventory component, and the maximized performance of the network is produced using the assessed information.

2. The system according to claim 1, wherein the combined information is stored in a database.

3. The system according to claim 1, further comprising an XML (Extensible Markup Language) produced from the extracted inventory information, wherein the XML is converted to a canonical form.

4. The system according to claim 1, wherein the assessment component further determines whether inconsistencies exist between the monitoring component and network rules.

5. The system according to claim 1, wherein the assessment component produces a comprehensive topology visualization using the combined information.

6. A method for maximizing performance of a network comprising steps of:
   extracting configuration information of the network;
   extracting inventory information of the network;
   extracting monitoring information of the network;
   combining the configuration information, the inventory information, and the monitoring information;
   assessing device configuration using the combined information, the assessing comprising at least determining whether inconsistencies exist between the configuration information and the inventory information; and
   producing a maximized performance of the network using the assessed information.

7. The method according to claim 6, wherein the combined information is stored in a database.

8. The method according to claim 6, wherein the step of extracting inventory information further comprises:
   producing an XML (Extensible Markup Language) containing the inventory information; and
   converting the XML to a canonical form.

9. The method according to claim 6, wherein the step of assessing the device configuration further determines whether inconsistencies exist between the monitoring component and network rules.

10. The method according to claim 6, wherein the step of assessing the device configuration further comprises producing a comprehensive topology visualization using the combined information.

11. A non-transitory computer readable medium having computer readable program for operating on a computer for maximizing performance of a network, said program comprising instructions that cause the computer to perform the steps of:
    extracting configuration information of the network;
    extracting inventory information of the network;
    extracting monitoring information of the network;
    combining the configuration information, the inventory information, and the monitoring information;
    assessing device configurations using the combined information, the assessing comprising at least determining whether inconsistencies exist between the configuration information and the inventory information; and
    producing a maximized performance of the network using the assessed information.

12. The non-transitory computer readable medium according to claim 11, wherein the combined information is stored in a database.

13. The non-transitory computer readable medium according to claim 11, wherein the step of extracting inventory information further comprises:
    producing an XML (Extensible Markup Language) containing the inventory information; and
    converting the XML to a canonical form.

14. The non-transitory computer readable medium according to claim 11, wherein the assessing the device configuration further determines whether inconsistencies exist between the monitoring component and network rules.

15. The non-transitory computer readable medium according to claim 11, wherein the assessing the device configuration further comprises producing a comprehensive topology visualization using the combined information.

* * * * *